US007027719B1

(12) United States Patent
Schneider et al.

(10) Patent No.: US 7,027,719 B1
(45) Date of Patent: Apr. 11, 2006

(54) CATASTROPHIC EVENT-SURVIVABLE VIDEO RECORDER SYSTEM

(75) Inventors: Paul J. Schneider, McGregor, TX (US); Steven E. Parker, Waco, TX (US); Stephen M. Morgan, Waco, TX (US)

(73) Assignee: Raytheon Company, Dallas, TX (US)

( * ) Notice: Subject to any disclaimer, the term of this patent is extended or adjusted under 35 U.S.C. 154(b) by 857 days.

(21) Appl. No.: 09/676,333

(22) Filed: Sep. 29, 2000

Related U.S. Application Data

(60) Provisional application No. 60/158,702, filed on Oct. 8, 1999.

(51) Int. Cl.
*H04N 7/26* (2006.01)
*H04N 7/18* (2006.01)

(52) U.S. Cl. .................... 386/109; 348/143; 348/144
(58) Field of Classification Search ............... 386/109, 386/111, 112, 27, 33, 124, 125, 126, 117, 386/118, 107, 104, 105, 46, 1, 38, 40, 45; 348/143, 148, 144; 360/5, 6
See application file for complete search history.

(56) References Cited

U.S. PATENT DOCUMENTS

| 4,644,494 A | 2/1987 | Muller ................... 364/900 |
| 4,694,119 A | 9/1987 | Groenewegen ......... 174/52 PE |
| 4,729,102 A | 3/1988 | Miller, Jr. et al. .......... 364/242 |
| 4,816,828 A | 3/1989 | Feher |
| 4,831,438 A | 5/1989 | Bellman, Jr. et al. ....... 358/108 |
| 4,944,401 A | 7/1990 | Groenewegen ............. 206/521 |
| 5,123,538 A | 6/1992 | Groenewegen ............. 206/521 |
| 5,283,643 A | 2/1994 | Fujimoto .................... 248/143 |
| 5,497,419 A | 3/1996 | Hill .............................. 380/9 |
| 5,499,164 A | 3/1996 | Hill-Lindsay et al. ...... 361/785 |
| 5,604,534 A | 2/1997 | Hedges et al. |
| 5,708,565 A | 1/1998 | Fairbanks ................... 361/704 |
| 5,740,047 A | 4/1998 | Pilley et al. |
| 5,742,336 A | 4/1998 | Lee |
| 5,750,925 A | 5/1998 | Purdom .................... 174/52.1 |
| 5,756,934 A | 5/1998 | Purdom .................... 174/52.1 |
| 5,798,458 A | 8/1998 | Monroe |
| 5,841,638 A | 11/1998 | Purdom et al. ............. 361/790 |
| 6,591,012 B1* | 7/2003 | Fujioka ..................... 382/232 |

FOREIGN PATENT DOCUMENTS

WO    WO 97/23075    6/1997

OTHER PUBLICATIONS

International Search Report dated Jan. 20, 2001 for PCT/US00/27334.
L-3 Communications, Fairchild A200S Solid State Cockpit Voice Recorder (Feb. 6, 1998).

(Continued)

*Primary Examiner*—Robert Chevalier
(74) *Attorney, Agent, or Firm*—O'Keefe, Egan & Peterman, LLP (57) ABSTRACT

A catastrophic-event survivable video data recording system that may be employed to monitor vehicles or facilities. The recording system may include a video data compression unit operable to provide compressed digital video data in a format recordable by modified commercially available flight data recording instruments. Among other things, the system may be used to monitor vehicles, as well as land-based or sea-based facilities. The system may also be employed as an aid to research into natural and man made phenomena, such as volcanic eruptions, bomb test explosions, etc.

41 Claims, 3 Drawing Sheets

OTHER PUBLICATIONS

Aydin Telemetry, Vector Products, VCE-800 Video Compression Encoder/Decoder Data Sheet (May 1997).

Rakefet, ADVISE™ Airborne Direct Visual Imaging for Safety Enhancement (reference available prior to Oct. 8, 1999).

Rakefet, CASCADE™ Crash Survivable Continuous Airborne Debriefing Equipment for Commercial Aircraft Systems Highlights (reference available prior to Oct. 8, 1999).

Rakefet, Technology Assessment of Airborne Camera Video Systems for Commercial Transport Aircraft, prepared for the AEEC's Technology Applications Group, San Diego (Sep. 11-12, 1995).

Penny & Giles, Flight Data Recorders information (Aug. 1996).

Rayethon Systems Company, "If a Picture is Worth a Thousand Words . . . Video is Worth a Million!" one page brochure (May, 1999).

Motorola parts list (Feb. 10, 1998).

Motorola PowerPlus VME (Feb. 10, 1998).

Motorola MVME2600 Processor Module (Feb. 10, 1998).

IMS VJ3100 VME JPEG NTSC Compression Card (Jan. 22, 1998).

Microchip, EPROM/ROM-Based 8-Bit CMOS Microcontroller Series (1997).

TEAC, V-80AB-F Videocassette Tape Recorder/Reproducer Maintenance Manual (reference available prior to Oct. 8, 1999).

B&D Instruments and Avionics, Inc., Digital Flight Data Recorder Installation and Operating Manual for Model 91005, Publication No. 91005-003-011 (Jan. 31, 1995).

Correspondence page from Aviation Week & Space Technology, p. 6 (Jan. 26, 1998).

Raytheon E-Systems EVC107-3/4 ATR VME Chassis (reference available prior to Oct. 8, 1999).

WindRiver Systems, VxWorks Brief Overview (reference available prior to Oct. 8, 1999).

Motorola, MVME4600 Twin Processor Module MVME712 I/O (Feb. 9, 1998).

* cited by examiner

CATASTROPHIC EVENT-SURVIVABLE VIDEO RECORDER SYSTEM

The present application claims priority on now abandoned U.S. provisional patent application Ser. No. 60/158,702 filed on Oct. 8, 1999, the entire text and all contents of which is specifically incorporated herein by reference.

BACKGROUND OF THE INVENTION

1. Field of the Invention

This invention relates generally to catastrophic event-survivable data recorders. In particular, this invention relates to catastrophic event-survivable video recording systems that employ video data compression and data recorders such as commercially available flight data recorders.

2. Description of the Related Art

Accident investigation is often costly, time consuming, and may be inconclusive. This is particularly true of catastrophic accidents involving vehicles such as aircraft, trains and ships. Other examples of catastrophic accidents in which accident investigation may be difficult include explosions occurring within facilities such as chemical plants and oil production or processing facilities. Many times such accidents may result in near to complete property destruction and loss of life. Thus, it is often difficult for investigators to determine factors which contributed to the cause of a particular accident.

In the field of aviation, flight data recorders and cockpit voice recorders have long been used to record information on aircraft systems and crew activities up to the time of occurrence of a catastrophic event. However, even with access to this information it may still be difficult for accident investigators to determine the cause of an aircraft crash, as when attempting to determine the source of a catastrophic explosion occurring in mid-flight. In the case of such an explosion, information from conventional flight data and cockpit voice recorders typically provide little, if any, information which would indicate the source of such an explosion. This problem may be further exacerbated when surviving components of a destroyed aircraft are very small, and/or lie in inaccessible areas such as deep water. Under such conditions, it may become very costly to recover and piece together destroyed portions of the aircraft in an effort to determine the source of an explosion or other failure.

At the present time, few alternatives exist to assist in the investigation of accidents involving catastrophic events such as mid-air explosions, with the exception of very expensive methods used to simulate and investigate such accidents in order to determine factors contributing to the accidents. Such expensive and time-consuming methods include, for example, computer simulations, re-enactments and re-assembly of destroyed components such as an aircraft fuselage.

SUMMARY OF THE INVENTION

Disclosed are methods and systems which may be employed to compress and store data in catastrophic event-survivable form including, for example, methods of compressing and storing data on conventional flight data recorders, and systems for doing the same. One example of such a system includes a catastrophic event-survivable video data recording system which may be employed to monitor and record catastrophic accidents, such as those occurring in land or sea-based facilities, or aboard vehicles. Advantageously, the disclosed catastrophic event-survivable video recording methods and systems may be employed to record actual video data during a catastrophic event such as a facility explosion or catastrophic transportation accident, and in a form which is capable of surviving the event and being replayed by safety investigators to determine the cause of the accident/incident. The system is easily adaptable for aircraft (e.g., private, commercial and military aircraft operations) as well as facility operations (e.g., plants, off-shore platforms, mines, pipeline facilities, etc.), as well as to any vehicle or facility that may be involved in an accident resulting in casualties, extensive property damage or loss, accident liability, etc.

In one embodiment, a relatively low cost, lightweight, catastrophic event-survivable video data recording method and system may be provided, one which provides a method of capturing and storing video data in crash-survivable form, utilizing relatively inexpensive and lightweight crash-survivable components. Surprisingly, such a system offers the capability to effectively capture, record and retain video data in a catastrophic event, such as a crash or explosion, without the need for relatively heavy recording equipment components and/or excessive amounts of computer memory or computer components. Advantageously, the disclosed method and system may be used to provide a video record of catastrophic incidents/accidents which may be used to decrease time and/or cost of investigation, while at the same time increasing the accuracy of the investigation conclusion. For example, relatively low cost, lightweight, crash-survivable video data recording methods and systems may be provided for use in vehicles. Surprisingly, by utilizing data compression, video data may be recorded and stored without the need for excessive computer memory and associated equipment, allowing minimization of system component size and weight.

In one embodiment, conventional and commercially available flight data recording equipment may be employed without the need for large amounts of computer memory. Because commercially available data compression and flight recording equipment may be employed to implement the methods and systems of this embodiment, system cost may be advantageously minimized. Because such commercial components are relatively lightweight and compact, installation aboard vehicles such as existing or new aircraft may be performed with a minimum amount of modification or loss of vehicle interior space. Further advantageously, the disclosed methods and systems may be employed, for example, with one or more cameras mounted at varying locations throughout a vehicle interior and/or exterior and/or may interface with existing vehicle video camera installations, further minimizing cost of implementation. In addition to military, business, private and commercial aircraft, these same advantages may be realized on all types and manner of vehicles including, but not limited to, trains, ships, space vehicles, submarines, trucks, cars, etc. Thus, due to data compression employed in the practice of the disclosed systems and methods, the advantages of relative low cost, lightweight and minimum space requirement may be realized in virtually any transportation-related application.

The disclosed methods and systems may also be used to provide catastrophic event-survivable video records of accident/incidents occurring in facilities, installations or any other environment in which such events may occur. Even in locations where weight and space requirements may not be a premium, the disclosed methods and systems may be used to advantageously provide a relatively low cost and readily available solution to the problem of generating a survivable video record of catastrophic events. For example, by utilizing readily available commercial video compression in combination with commercial flight data recorder components, the cost of a land or sea-based facility installation may be dramatically minimized. Furthermore, due to the relatively low cost of the disclosed system, a plurality of systems may be installed or deployed to monitor multiple areas of concern within a facility, such as a chemical plant, or oil production facility, etc. without incurring excessive cost. Monitoring multiple locations in such facilities is often desirable due to the large size and/or intricate nature of such facilities.

The disclosed methods and systems may utilize one or more video compression unit/s (or video data encoder/decoder/s) to convert analog video signals from one or more video camera/s into compressed digital format suitable for storage in one or more video data recorder/s (e.g., a conventional flight data recorder or cockpit voice recorder). For example, in one embodiment a system may include a video data compression unit and video data interface between conventional video camera and conventional flight data recorder equipment. Advantageously, by utilizing data compression, conventional and commercially available data recording units may be employed with little or no modification to record video crash data. By utilizing a video data interface, virtually any commercially available video encoder/decoder or compression unit may be utilized to process data into a format suitable for recording on virtually any commercially available data recording system having suitable memory to contain such data.

In one exemplary embodiment, a crash-survivable video data recording system may be provided that is capable of recording the last thirty minutes of a vehicle's route (e.g., aircraft, ship, train, submarine, helicopter, etc.) or facility operation (e.g., chemical plant, refinery, nuclear plant, offshore platform, pipeline facility, etc.) at about 250K bps. Advantageously, the recording system interfaces and reacts to the condition of the vehicle or facility in a manner similar to conventional crash data recorders, by storing data and cutting off input at predetermined accident parameters (e.g., primary power loss, etc.). Because of commonality with existing recorder systems, an investigating authority (e.g., NTSB, etc.) should require no hardware upgrade to process and view the video data. Further advantageously, the system may be interfaced with a variety of video camera types, requiring only a National Television Standards Committee ("NTSC") video output. This allows the ability to either tap into existing camera systems or to use a camera of choice. Furthermore, such a recorder system is also adaptable and upgradable as recorder and camera technologies advance, keeping upgrade costs to a minimum.

In one respect, disclosed is a catastrophic event-survivable video recording system, including a video data compression unit having at least one output, the output including compressed digital video data; and a video data recording unit having at least one input in signal communication with the output from the video data compression unit, the video data recording unit being capable of recording the compressed digital video data in catastrophic event-survivable form.

In another respect, disclosed is a catastrophic event-survivable video recording system, including a video data compression unit having at least one output, the output including compressed digital video data and having a serial data and clock stream generated at a rate of from about 250 Kbps to about 500 Kbps; and a video data recording unit having at least one input in signal communication with the output from the video data compression unit, the video data recording unit being capable of recording the compressed video data in catastrophic event-survivable form; wherein the system is configured for installation on a vehicle.

In yet another respect, disclosed is a catastrophic event-survivable video recording system, including a video data compression unit having at least one compressed digital video data output; a video data recording unit having at least one input in signal communication with the compressed digital video data output from the video data compression unit; and at least one video camera, the video camera having an output including analog video data; and wherein the video camera output is in signal communication with the video compression unit input; wherein the compressed video data output from the video compression unit may have a serial data and clock stream generated at a rate of about 256 Kbps; and wherein the video data recorder is capable of receiving and recording the video compression unit output; wherein the video data recorder is capable of saving at least about 30 minutes of compressed digital video data recorded prior to a catastrophic event; and wherein the system is configured for installation on an aircraft.

In yet another respect, disclosed is a method of recording raw video data onto a catastrophic event-survivable video recorder, including compressing the raw video data to form compressed digital video data; and recording the data on a video data recording unit in catastrophic event-survivable form.

In yet another respect, disclosed is a catastrophic event-survivable video recording system, including a video data compression unit having at least a first output, the first output including compressed digital video data; a video data recording unit having at least a first input in signal communication with the first output from the video data compression unit, the video data recording unit being capable of recording compressed digital video data in catastrophic event-survivable form; and a video data interface in signal communication between the video compressor first output and the video data recording unit first input, the video data interface being capable of converting the compressed video data of the video data compression unit first output to a compressed video data signal that is suitable for recording by the video data recording unit as a signal input to the video data recording unit first input. Advantageously, the video data recording unit may be a conventional flight data recording unit, including those that are commercially available, and/or the video data recording unit may be capable of saving at least about 30 minutes of compressed digital video data recorded prior to a catastrophic event. The video data compression unit of the system may further include at least a first input, the first input including analog video data, and the video data compression unit being capable of converting the analog video data to the compressed digital video of the video data compression unit first output. The video data interface may be capable of converting the compressed video data of the video data compression unit first output to compressed video data output having a serial data and clock stream generated at a rate of from about 250 Kbps to about 500 Kbps, alternatively about 256 Kbps; and the video data recording unit may be capable of receiving and recording the compressed video data output having a serial data and clock stream generated at a rate of from about 250 Kbps to about 500 Kbps, and alternatively about 256 Kbps. In one embodiment of the system, the video data compression unit may produce the compressed digital video data first output at a variable rate. The system may further include at least one video camera, the video camera having an output including analog video data; and wherein the video cameral output is in signal communication with the video compression unit first input.

In one embodiment of the system, the video data recording unit may have at least a first output, the first output including compressed digital video playback data, with the video data recording unit being capable of playing back the compressed digital video data that is recorded in catastrophic event-survivable form. The video data compression unit may have a second input in signal communication with the first output from the video data recording unit and may have a second output including analog video playback data, with the video data compression unit being capable of converting compressed digital video data to the analog video playback data; and with the video data interface being capable of converting the compressed digital video playback data of the video data recording unit first output to a compressed digital video data signal that is suitable for input to the second input of the video data compression unit and conversion by the video data compression unit to the analog video playback data of the video data compression unit second output.

In yet another respect, disclosed is a catastrophic event-survivable video recording system, including: a video data compression unit having at least a first output, the first output including compressed digital video data; a video data recording unit having at least a first input in signal communication with the first output from the video data compression unit, the video data recording unit having at least a recording mode in which it is capable of recording compressed digital video data in catastrophic event-survivable form; a video data interface in signal communication between the video compressor first output and the video data recording unit first input, the video data interface having at least a recording mode in which it is capable of converting the compressed video data of the video data compression unit first output to a compressed video data signal that is suitable for recording by the video data recording unit as a signal input to the video data recording unit first input; and at least one video camera, the video camera having an output including video data; and wherein the video camera output is in signal communication with the video compression unit first input; wherein the video data interface is capable of converting the compressed video data of the video data compression unit first output to compressed video data having a serial data and clock stream generated at a rate of from about 250 Kbps to about 350 Kbps, alternatively of about 256 Kbps. The video camera may have an output including analog video data; and the video data compression unit may be capable of converting the analog video data to the compressed digital video of the video data compression unit first output.

In one embodiment of the system, the video data recording unit may have at least a first output, the first output including compressed digital video playback data, the video data recording unit having a playback mode in which it is capable of playing back the compressed digital video data that is recorded in catastrophic event-survivable form; and the video data compression unit may have a second input in signal communication with the first output from the video data recording unit and may have a second output including video playback data, the video data compression unit having a playback mode in which it is capable of converting compressed digital video data to the video playback data; and the video data interface being capable of converting the compressed digital video playback data of the video data recording unit first output to a compressed digital video data signal that is suitable for input to the second input of the video data compression unit and conversion by the video data compression unit to the video playback data of the video data compression unit second output.

In another embodiment, the system may further include a video processor and a cockpit control unit. The video processor may have a control input, a video data input and a video data output; the cockpit control unit may have a control output, video data input and video data output; the video processor video data input may be in signal communication with an analog video data output of the video compression unit; the video processor video data output may be in signal communication with the video data input of the cockpit control unit; the video processor control input may be in signal communication with the cockpit control unit control output; the cockpit control unit video output may be in signal communication with at least one video display configured to be used or mounted within the aircraft; and the cockpit control unit may be capable of controlling the video processor video data output to the video display.

In another embodiment, the system may include a cockpit control unit that has a control output that is in signal communication with a control input of the video data compression unit, and the cockpit control unit may have a control output that is in signal communication with a control input of the video data recording unit, The video data compression unit second output may be in signal communication with at least one video display configured for mounting within the aircraft; and the cockpit control unit may be capable of controlling the recording and playback modes of the video compression unit and the video data recording unit so as to control recording of the video data from the video camera by the video data recording unit, so as to control display of the video playback data by the video display, or a combination thereof. In this regard, it will be understood with benefit of this disclosure that a large number of recording/playback options may be possible, and that these options may be offered separately or in many combinations as so desired to fit given situations. For example, the capability may be provided so that video playback data may be displayed during flight, simultaneous with recording of new video data from, for example, a video camera. In another example, a cockpit control unit may be configured to only have limited control of the system, for example, so that it cannot control or alter recording of video data during flight only, or so that it cannot control or alter video data recording at any other time. Furthermore, a system may be configured so that playback is only possible via a password code entered into a cockpit control unit (e.g., a password known only by the pilot and/or ground personnel). A system may be configured so that playback is only possible via playback on the ground, for example, using such a password or alternatively via playback from the system components directly to ground equipment without interface with a cockpit control unit. Alternatively, ground playback may be possible in combination with the ability to playback video data using a cockpit control unit.

In yet another respect, disclosed is a method of recording raw video data (e.g., raw analog video data, raw digital video data) onto a catastrophic event-survivable video recording unit, including: compressing the raw video data to form compressed digital video data; converting the compressed digital video data to a compressed video data signal that is suitable for recording by a video data recording unit; and recording the data on a video data recording unit in catastrophic event-survivable form. The raw video data may include analog video data generated by at least one video camera; the compressing may further include converting the analog video data to the compressed digital video data. The compressed digital video data may have a serial data and clock stream generated at a rate of from about 250 Kbps to about 500 Kbps; the raw video data generation, compression and recording may occur on an aircraft; and the video data recording unit may be a conventional flight data recording unit capable of saving at least about 30 minutes of compressed digital video data recorded prior to a catastrophic event.

DESCRIPTION OF ILLUSTRATIVE EMBODIMENTS

The disclosed method and apparatus may be used to provide crash-survivable and catastrophic incident-survivable video recording systems for use in any application in which a survivable video record of an accident or catastrophic incident is desired. As used herein, "catastrophic event-survivable" and "catastrophic event-survivable form" include any device and/or recording media capable of surviving, for example, heat, pressure and/or shock associated with vehicle collisions (e.g., aircraft, trains, busses, helicopters, hydroplanes, automobiles, trams, subways, spacecraft, etc.), explosions and fires (e.g., explosions that are impact-induced, and/or that result from explosives, natural gas, gasoline, flammable chemicals, etc.), and/or water damage when exposed to or submerged under water for long periods of time. Further information on such devices and recording media may be found, for example, in U.S. Pat. Nos. 4,644,494; 4,694,119; 4,729,102; 4,944,401; 5,123,538; 5,283,643; 5,499,164; 5,708,565; 5,750,925; 5,756,934; and 5,841,638; each of which is incorporated herein by reference. Commercially available examples of such devices include, for example, commercially available flight data recorders and/or cockpit voice recorders manufactured for use in aircraft to record crash event data that may be recovered and analyzed during aviation crash investigations.

With regard to commercially available flight data recorders and cockpit voice recorders, such devices typically meet FAA requirements of Technical Standard Order TSO-C123a, Cockpit Voice Recorder System. In this regard, the FAA's proposed Technical Standard Order TSO-C123a, Cockpit Voice Recorder System, requires 60-minutes exposure to high temperature fire, environment conditions given in EUROCAE ED-14C and RTCA/DO-160C, as well as RTCA/DO-178B standard software development procedures, standardized markings, adequate documentation, etc. Furthermore, commercially available flight data recording and cockpit voice recording systems may be built to withstand the following conditions: 3400 G shocks, a 500-pound lance dropped from 10 feet, 5000 pounds of crushing force for five minutes, 2000° F. flames for thirty minutes, 500° F. flames for ten hours, and a thirty-day submersion in 20,000 feet of sea water.

Applications in which the disclosed method and apparatus may be employed include, but are not limited to those involving industries such as the transportation, chemical, oil and gas, nuclear, military, space, etc. Examples of specific applications in which the disclosed method and apparatus may be employed include, but are not limited to, aircraft, ships, trains, submarines, helicopters, chemical plants, mines, oil and gas production facilities (including offshore platforms, pipelines and drilling rigs), nuclear plants, etc. In any given application more than one video camera may be employed to record multiple records. Furthermore, both exterior views (e.g., of vehicle exteriors, process equipment, etc.), as well as interior views of (e.g., of cockpits, passenger cabins, control rooms, operator consoles, etc.) may be monitored and recorded. In such a way, crash or catastrophic incident survivable records may be made of facility or equipment failure, as well as operator action and/or instrumentation at the time of a catastrophic event or crash. In still other embodiments, the disclosed catastrophic event-survivable video recording methods and systems may be employed to gather research data, such as for monitoring of natural events like volcanic eruptions, failure testing, fire testing, etc.

Examples of just a few of the applications that the disclosed catastrophic event-survivable video data recorder systems may be employed to monitor include, but are not limited to, aircraft (e.g., exterior fuselage and control surfaces, interior passenger cabin and cockpit monitoring, baggage compartment, cargo hold, flight deck instruments, view of weather and runway conditions, etc.), railroad (e.g., exterior engine and railroad car views, interior passenger cabin, cargo hold, baggage compartment, cockpit view including instruments, forward facing view of track and crossing gate condition, etc.), chemical/nuclear/petroleum facilities (e.g., exterior view of process equipment, interior view of control room, etc.), ship monitoring (exterior view of water and weather conditions, interior views of bridge instrumentation, cargo hold, baggage compartment, etc.), submarines (interior views of cabins, engine rooms, control room and/or instrumentation, etc.) In one embodiment, the disclosed systems may be employed on existing or new commercial aircraft available from manufacturers such as Boeing, McDonnell-Douglas and Airbus. Specific examples of such aircraft include, but are not limited to, Boeing 707, Boeing 717, Boeing 727, Boeing 737, Boeing 747, Boeing 767, Boeing 777, DC-9, DC-10, MD-80, MD-11, Airbus 300, Airbus 310, Airbus 330, Airbus 340, etc.

Figure 1:
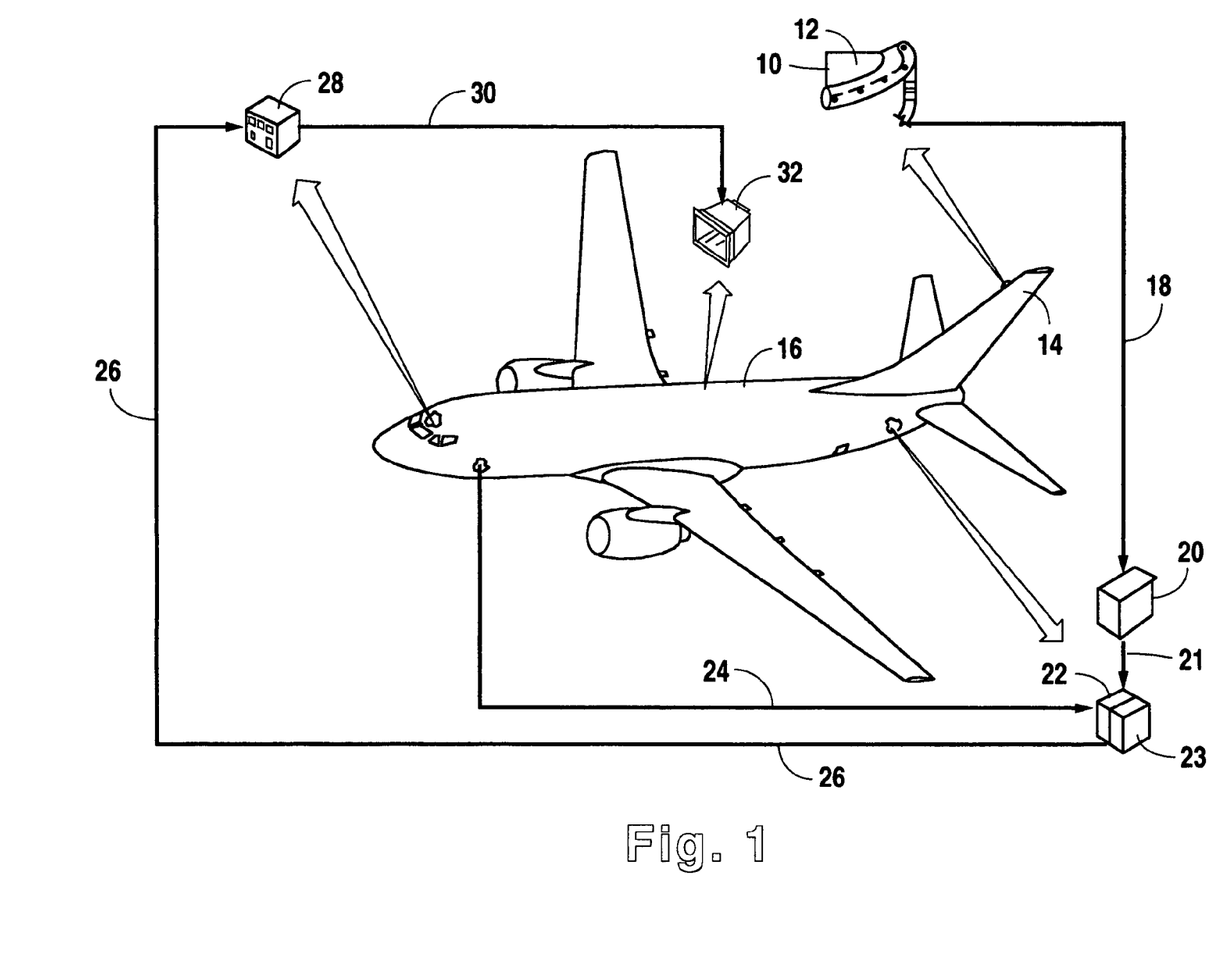
FIG. 1 is a simplified schematic of a catastrophic event-survivable video recording system installed on an aircraft according to one embodiment of the disclosed method and apparatus.

FIG. 1 illustrates one embodiment of the disclosed catastrophic event-survivable video data recording system installed on an aircraft and including commercially available components that are in signal communication with each other. By "in signal communication" it is meant that components may be electrically connected, coupled, or otherwise configured to send and receive signals including, but not limited to, electrical signals, radio signals, optical signals, ultrasonic signals, etc.

As illustrated in FIG. 1, commercially available video camera 10 is mounted in vertical fin camera assembly 12 which is installed on vertical fin 14 of aircraft 16. Analog video output data is conveyed via analog video output signal communication path 18 to data compression unit 20, which converts the video data to digital form, compresses it, and outputs it to video data recorder 22 as compressed digital video output 21. In one embodiment, video data recorder 22 may be a commercially available flight data recorder with a memory of from about 2 MB to about 64 MB although video data recorder memory may be greater or less than this range. In one case, such a memory range will typically allow recording of from about one minute to about thirty minutes of video data recorder prior to a catastrophic event. One example of such a recorder is a "FA-2100", available from L3 Communications Corporation, having a sufficient amount of memory (64 MB) to allow up to about 30 minutes of compressed video data to be stored at a constant rate of 256 Kbps, although it will be understood with benefit of this disclosure that greater and lesser rates are also possible, such as when employing other equipment combinations. For example, in many cases it may be desirable to utilize commercially available equipment having the fastest processing speed and largest memory capacity that are available at a given time. Alternatively, this may not be necessary; e.g., where shorter recording times or slower data speeds are acceptable. Furthermore, the foregoing are examples only, and advantages of the disclosed system may be realized with any data recorder system capable of storing compressed digital video data, as long as sufficient memory exists to allow recording of a segment of compressed video data prior to a catastrophic event.

In the embodiment of FIG. 1, data compression unit 20 converts analog video data output signal 18 to digital video output signal 21, which is transmitted to video data recorder 22, where it is recorded in crash-survivable form. Although a suitable data compression unit 20 may be a device only capable of compressing data for recording, a suitable data compression unit 20 may also be a video data encoder/decoder such as an Aydin "VCE/D-800," which contains both an encoder for compressing video, and a decoder which expands and reconstitutes the original video. In the case of an Aydin "VCE/D-800", electrical jumpers may be used to configure the device for either function. Furthermore, data compression unit 20 may also be a device capable of accepting digital video signals, such as from a digital video camera or other source, or from an analog-to-digital data conversion unit placed intermediate between an analog video source and data compression unit 20.

Also illustrated in FIG. 1 are power supply 24 which powers the various selected components in the system. In one embodiment, conventional aircraft power supply may be employed (typically about 28 volts DC), although other forms of power supply may be employed, including other voltage and/or frequencies of AC power, as well as DC power supplies (including batteries). In one embodiment, loss of this power may be a "predetermined accident parameter" selected to terminate accident recording as described elsewhere herein.

FIG. 1 also illustrates optional components which may be employed in addition to video camera 10, video compression unit 20 and video data recorder 22. For example, video processing unit 23 may be configured to allow an aircraft pilot to switch compression unit 20 (e.g., video encoder/decoder) and video data recorder 22 from record to playback, e.g., when the pilot wants to carefully and repeatedly review video of some event, such as a near-midair collision, and/or enable a pilot to stop video data recording, so that such a recorded incident is preserved and not overwritten. In one embodiment, technicians on the ground may also plug in a monitor and use this playback feature to repeatedly view stored video data. As shown in FIG. 1, video processing unit 23 may be coupled to cockpit control unit 28 via control signal communication path 26 so as to allow control of video monitoring and recording functions from the cockpit. For example, a system may be configured so that live or playback video data is viewable on existing instrument panel CRT's. In another embodiment, cockpit control unit 28 may allow a live video output signal from video camera 10 to be directed to an aircraft in-flight entertainment system via video output signal 30 for display by video monitor/s 32 positioned in the passenger cabin of aircraft 16. Other optional equipment includes video data interface 11 (shown and discussed in relation to FIG. 2) that may be employed in place between video compression unit 20 and video data recorder 22 wherever necessary or desirable to modify the signal and/or data characteristics of compressed digital video data 21 to render it suitable for recording by a video data recording unit 22, for example as modified signal 17 shown in FIG. 2. Although a cockpit control unit is described in this exemplary embodiment, it will be understood with benefit of this disclosure that a control unit having the same characteristics as a cockpit control unit may be employed in embodiments of the disclosed systems used in non-aircraft embodiments described elsewhere herein.

As shown in FIG. 1, video data recording system components 20, 22 and 23 may be located in an aft section of aircraft 16 in a manner and location commonly employed for location of conventional flight data recording systems. However, it will be understood with benefit of this disclosure that one or more of these components may be located in alternative positions within an aircraft fuselage that allow interconnection between system components.

Although FIG. 1 illustrates one embodiment having a single video camera 10 mounted on vertical tail fin 14 of aircraft 16, it will be understood for the benefit of this disclosure that various alternative camera locations, as well as combinations of locations may be provided. For example, cameras may be located at virtually any position within the interior or exterior of an aircraft fuselage or other component, and may be used to view the status of interior and/or exterior parts of an aircraft. Just a few of the many possible exterior locations for one or more video cameras include, but are not limited to, positioning on exterior surfaces of an aircraft fuselage at substantially any point around the circumference of the fuselage (e.g., in forward, middle or aft position/s), substantially any position on wings or vertical and/or horizontal stabilizers, engine components, nose gear or main gear assemblies, etc. Examples of possible interior positions include interior positions at virtually any point within an aircraft passenger cabin, cargo hold, cockpit (including positions suitable for viewing crew members, instrumentation, window views), etc. Furthermore, although FIG. 1 illustrates an example installation in an aircraft, the disclosed systems and methods may be deployed to monitor other types of vehicles, facilities and for other purposes, as described elsewhere herein.

Figure 2:
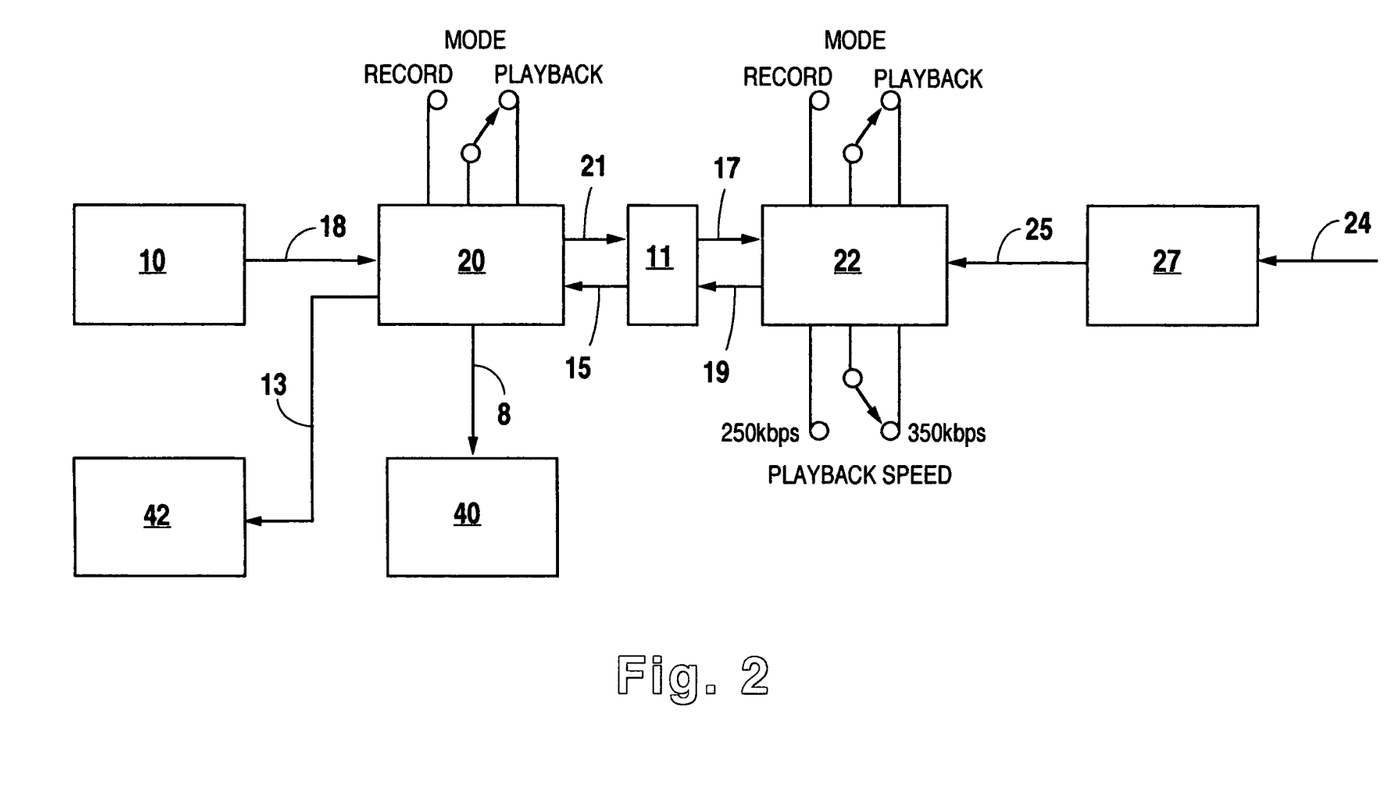
FIG. 2 is a simplified block diagram of a catastrophic event-survivable video data recording system according to one embodiment of the disclosed method and apparatus.

FIG. 2 illustrates a simplified block diagram of one embodiment of the disclosed crash-survivable video data recording system. As shown in FIG. 2, video camera 10 supplies analog video data 18 to video compression unit 20 (in this case a video encoder/decoder unit). Video camera 10 may be any video camera suitable for use in the environment of the desired application, interior or exterior. Camera types may range from relatively simple home video cameras (available from manufacturers such as Sony of Japan) to sophisticated aviation equipment having, for example, fisheye lenses, lenses to which water does not adhere, and/or automatic night vision capability to allow operation in all lighting conditions. Cameras or camera housings may be shaped to conform to aircraft exterior shapes, such as the leading edge of a vertical stabilizer. For aircraft interior and exterior locations, examples of suitable video cameras include, but are not limited to, FlightVu "FV0300" color external aerospace camera and "FV0200" color internal aerospace camera available from DM Aerospace of Reston, Va.; and "AVS420-ZX" interior camera available from Aerial View Systems of Newport Beach, Calif. The "AVS420-ZX" camera may be mounted, for example, in a forward-facing direction on an aircraft dashboard for an outside view.

As shown in FIG. 2, video compression unit 20 (in this case a video encoder/decoder unit) receives analog video data 18 from video camera 10 and outputs this data as compressed digital video data stream 21 suitable for input and recording by video data recorder 22. In this regard, any suitable combination of video compression equipment 20 with video data recording equipment 22 may be employed. In one embodiment, a commercially available video encoder/decoder unit may be employed to convert analog video signal 18 to a compressed digital video signal 21 for recording by a commercially available video flight data recorder 22. Using such a combination, advantageously reduces equipment costs and weight of crash-survivable video data recording system. Any video compression factor suitable for generating a record of sufficient length and clarity for a desired purpose may be employed. Table 1 lists a few exemplary combinations of video compression factors and frame rates for 200 MB capacity memory. For gathering the data of Table 1, a "DC30 Plus" video compressor available from miroVideo of Palo Alto, Calif., was used.

TABLE 1

| Combination Number | Compression Factor | Frame Rate (frames per second) | Data Rate[1] (K bits per second) | Recording Time with 200 MB Capacity (Minutes) |
| --- | --- | --- | --- | --- |
| 1 | 9:1 | 30 | 500 | 7 |
| 2 | 12:1 | 30 | 350 | 10 |
| 3 | 22:1 | 30 | 200 | 17 |
| 4 | 9:1 | 20 | 333 | 10 |
| 5 | 12:1 | 20 | 233 | 14 |
| 6 | 22:1 | 20 | 133 | 25 |
| 7 | 9:1 | 10 | 167 | 20 |
| 8 | 12:1 | 10 | 117 | 28 |
| 9 | 22:1 | 10 | 67 | 50 |
| 10 | 9:1 | 5 | 83 | 40 |
| 11 | 12:1 | 5 | 58 | 57 |
| 12 | 22:1 | 5 | 33 | 101 |

[1]Maximum data rate for standard Small Computer System Interface ("SCSI") interfaces is 600 K bytes/second.

Examples of suitable commercially available video compression units include, but are not limited to, video compression units available from manufacturers such as Aydin Telemetry of Newtown, Pa.; L3 Communications Corporation of Sarasota, Fla.; Image Manipulation Systems of Andover, Minn. Examples of suitable commercially available flight data recorders include flight data recording equipment available from manufacturers such as L3 Communications Corporation of Sarasota, Fla.; D & D Instruments and Avionics of Valley Center, Kans.; British Aerospace Systems and Equipment of Fort Worth, Tex.; DM Aerospace of the United Kingdom; Penny and Giles Data Recorders of Santa Monica, Calif.; SFIM, Inc. of Grand Prairie, Tex.; Smiths Industries of Grand Rapids, Mich., etc.

Also shown in FIG. 2 is optional video data interface 11 which represents software and/or hardware modification of the bandwidth or other characteristics of compressed digital video data 21 that is output from video compression unit 20, to a signal 17 of the form that may be recorded by video data recording unit 22. Although optional, video data interface 11 may be necessary with certain equipment combinations. In this regard, video data interface 11 may be employed wherever necessary or desirable to modify the signal and/or data characteristics of compressed digital video data 21 to render it suitable for recording by a video data recording unit 22. Although shown as a separate block in FIG. 2, it will be understood that the function of a video interface unit 11 may be performed by, for example, a processor internal to one or more of the other components of a system, such as a processor integral to, or contained within, video recording unit 22, that has been programmed to perform the necessary modification to data stream 21.

It will be understood that when video data interface 11 is not required, compressed digital video data 21 may be fed directly from compression unit 20 to recording unit 22 and playback signal 19 (when a playback feature is present) fed directly from recording unit 22 to compression unit 20 (which may be optionally configured with a playback mode to decompress recorded digital video data and convert it to analog playback video data, as described further herein). For example, when an Aydin "VCE/D-800" video compression unit is combined with a L3 Communications Corporation "FA-2100" data recorder, a software modification may be made to allow the processor in the "FA-2100" to run at its native 250 Kbps speed, rather than the software-modified slower processing speed it is manufactured with. This modification allows direct video data communication between compression unit 20 and recording unit 22, without need for separate data interface 11. The slower processor speed is conventionally employed in commercially available "FA-2100" recording units to allow recording of several hours of slowly changing aircraft data.

In one embodiment, a video data compression unit may produce an output having a serial data and clock stream of from about 31.25 K bits/second to about 2000 K bits/second, while a video data recording unit may have an input serial data and clock stream requirement of from about 19 K bits/second to about 256 K bits/second. With benefit of this disclosure, those of skill in the art will understand that any processor, microprocessor, computer, mini-computer, etc. suitable for modifying characteristics (e.g., bandwidth, frame format, etc.) of digital data may be employed in combination with suitable programming to perform the function of a video data interface.

In addition to recording digital data, video data recording unit 22 may also be configured for optional playback of video data 19, for example, during normal flight operations or for retrieval of data following a catastrophic event. If necessary, playback data 19 may be processed by video interface 11 to produce a modified playback signal 15 suitable for processing by video compression unit 20, which may also be optionally configured with a playback mode to decompress recorded digital video data and convert it to analog playback video data 13 and/or 8 suitable for display or recording by conventional video recording equipment 42 and/or conventional video monitor equipment 40. Although not shown in FIG. 2, an optional video processing unit 23 (as described and illustrated in relation to FIG. 1), may be provided to switch video processing unit 20 and video data recording unit 22 from record to playback. modes and vice-versa. Although signal paths 8 and 13 are illustrated in FIG. 2 as separate signal path outputs from video compression unit 20, it will be understood that a single analog playback video data signal may be output from video compression unit 20 (e.g., as is the case with an Aydin "VCE/D-800" video compression unit described elsewhere herein) and then split or otherwise directed to both video recording equipment 42 and conventional video monitor equipment 40.

Although conventional video recording and/or conventional video monitor equipment is described in relation to some of the exemplary embodiments discussed herein, it will be understood that any type of video display suitable for displaying video data may be employed, including but not limited to, digital video monitors, digital or analog heads-up displays, etc. Furthermore, digital cameras or other digital video data-generating components may be employed. Thus a system may include a combination of digital and analog video data components, or may include all digital components, as so desired for a given situation.

Figure 3:
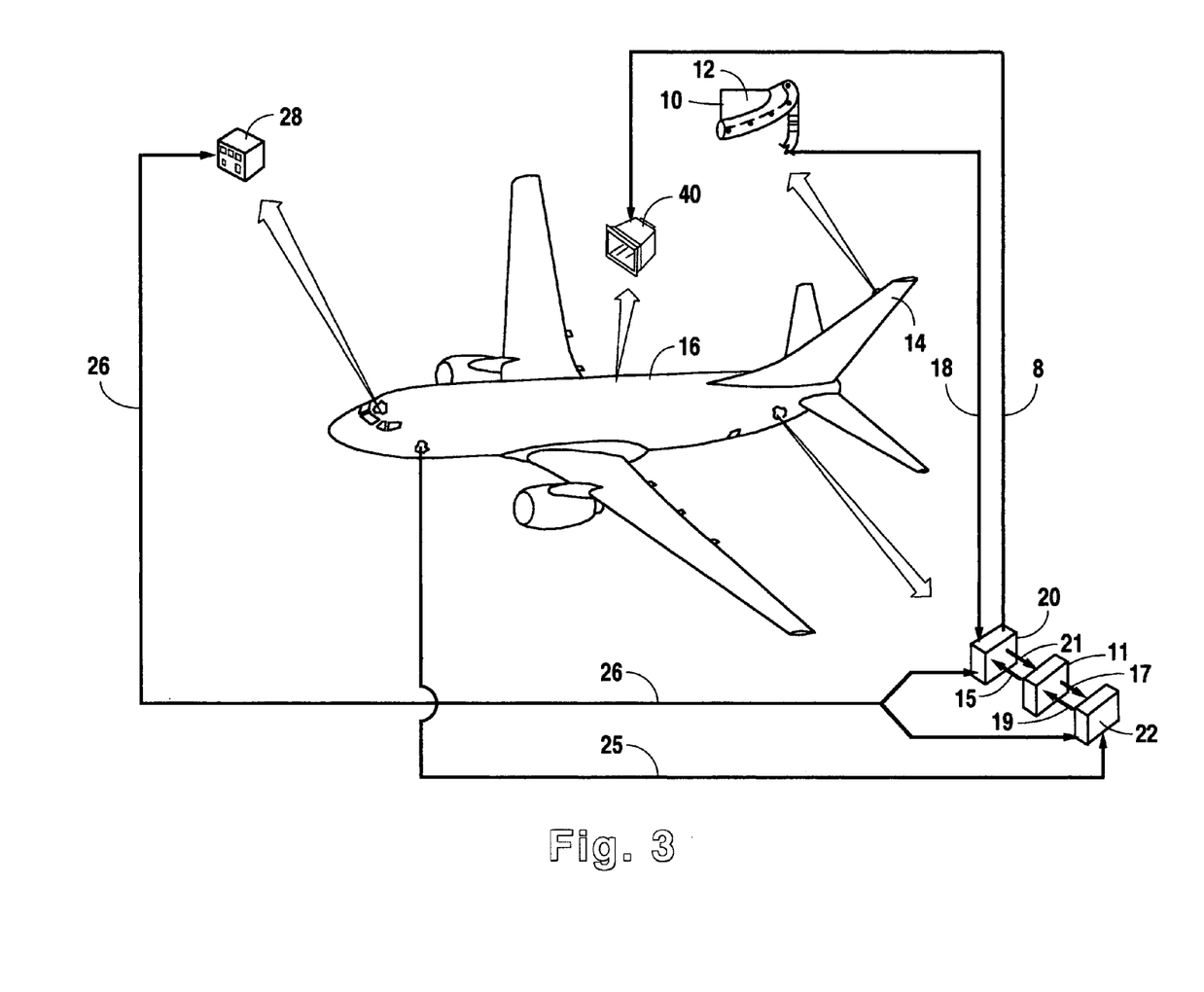
FIG. 3 is a simplified schematic of a catastrophic event-survivable video recording system installed on an aircraft and corresponding to the block diagram embodiment of FIG. 2.

In one exemplary embodiment, a commercially available video encoder/decoder unit having a constant data rate, such as an Aydin Telemetry "VCE/D-800" video encoder/decoder, may be employed to process analog video signal from a DM Aerospace video camera mounted on the upper leading edge of a vertical stabilizer, such as is illustrated in FIGS. 1 and 3. An Aydin Telemetry "VCE/D-800" encoder/decoder produces a digital video data output signal having a serial data and clock stream constant data rate of from about 31.25 Kbps bits/second to about 2 Mbps. In another embodiment a "VJ3100" JPEG Compression Card available from Image Manipulation Systems may be employed.

A model "FA2100" solid state cockpit voice recorder available from L3 Communications Corporation (having a memory storage capacity of about 64 Mbytes) may be configured in signal communication with the Aydin Telemetry "VCE/D-800" video encoder/decoder to allow recording and optional playback of recorded video signals. In this regard, the "FA2100" may accept the compressor's non-return to zero ("NRZ") data via a synchronous 256 Kbps input (using data interface modification previously described). In one embodiment, the "VCE/D-800" produces acceptable video record when adjusted to 256 Kbps (specification limits: 31.25 to 2000 Kbps), and the "FA2100" continuously accepts data at 256 Kbps. Where playback is desired, multiple playback speeds may be provided as shown in FIG. 2, in this embodiment 256. Kbps and 350 Kbps, and alternatively 256 Kbps and 512 Kbps.

In the embodiment of FIG. 2, power converter 27 is employed to convert aircraft power supply 24 (150 volts AC, 400 Hz) to 28 volt DC voltage 25. Other optional equipment illustrated in FIG. 2, include optional video tape recording unit 42 and optional NTSC video monitor 40. In this regard, optional video recorder 42 may be employed to replicate recordings for the media while optional video monitor 40 may be used to instant-replay incidents for the pilot. For example, after an incident, the National Transportation Safety Board may use video recorder 42 to provide a standard VHS cassette video tape to the media for an accident investigation news release. If desired, optional recorder 42 may be a separate component that is connected to the system on the ground. During flight operations, the pilot may use video monitor 40 to view an instant replay of an incident in the cockpit. As described elsewhere herein, other additional components may be provided including, but not limited to, additional monitors, cameras, video recorders, and video data recorders, etc. Furthermore, it will be understood with the benefit of this disclosure that multiple cameras may be provided with a manual or automatic switching unit for selectably directing the feed from two or more individual camera units into video data recorder 22.

Furthermore, it will be understood for the benefit of this disclosure that in those cases where sufficient recording capability exists in video data recording unit 22, the feed from multiple video cameras 10 may be simultaneously recorded, and/or where increased recording bandwidth is available, it may be employed to record clearer pictures with less compression.

In addition to the embodiment illustrated in the block diagram of FIG. 2, other combinations of video compression units and flight data recorder units are possible. To minimize cost and weight, it will be understood that constant data rate and/or maximum compression capability may be desirable; however, video compression units that produce variable data rates may also be paired with flight data recorders in the practice of the disclosed method and apparatus. For example, in one embodiment, a "VJ-3100" video compressor available from Image Manipulation Systems of Andover, Minn., may be employed. Because such a "VJ-3100" unit produces a variable output data stream, a processor (such as a "VME2604 Power PC" processor from Motorola) may be employed to act as video data interface 11 between the "VJ-3100" unit and a flight data recorder, such as a "FA2100 SOLID STATE COCKPIT VOICE RECORDER" available from L3 Communications Corporation. In another exemplary embodiment, a single chip computer (such as a "PIC-16" from Microchip of Phoenix, Ariz.) may be employed to act as a video data interface 11 between a video compression unit and a video data recorder. In yet other embodiments, PC plug-in CPU cards may be employed as video interfaces with a variety of video compressors, including JPEG video compressors. Just one of many examples of CPU cards is "SBC-554" available from Aaeon of Hazlet, N.J.

In any of the disclosed embodiments, examples of other types of suitable video compressors include, but are not limited to, "VISCOUNT" available from Prima Graphics of Litlington, England "MULTI-FUNCTION VIDEO BOARD" available from RGB Spectrum of Alameda, Calif., "TARGA" available from Pinnacle Systems of Phoenix, Ariz. Other types of suitable flight data recorders include, but are not limited to, a 72 Mbyte, 4 Mbps "Model 3253" Voice and Data Recorder ("VADR") available from Smiths Industries Aerospace of Grand Rapids, Mich.; a "253-E1568-00" available from L3 Communications; a 36 MB Cockpit Voice Recorder ("CVR") that accepts up to four 3 KHz analog signals from Allied Signal of Phoenix, Ariz.; a Quick Access Recorder ("QAR") from Penny & Giles, etc.

FIG. 3 illustrates an embodiment of the disclosed catastrophic event-survivable video data recording system installed on an aircraft and corresponding to the embodiment of FIG. 2. As described elsewhere herein, this embodiment may include commercially available components that are in signal communication with each other. As with the embodiment of FIG. 1, commercially available video camera 10 is mounted in vertical fin camera assembly 12 which is installed on vertical fin 14 of aircraft 16. As shown in FIG. 3, video camera 10 supplies analog video data 18 to video compression unit 20 (in this case a video encoder/decoder unit). Video compression unit 20 (in this case a video encoder/decoder unit) receives analog video data 18 from video camera 10 and outputs this data as compressed digital video data stream 21 suitable for input and recording by video data recorder 22. As described in relation to FIG. 2, any suitable combination of video compression equipment 20 with video data recording equipment 22 may be employed, and in one embodiment, a commercially available video encoder/decoder unit may be employed to convert analog video signal 18 to a compressed digital video signal 21 for recording by a commercially available video flight data recorder 22. Also shown in FIG. 3 is optional video data interface 11 that modifies characteristics of compressed digital video data 21 that is output from video compression unit 20 to a signal 17 of the form that may be recorded by video data recording unit 22.

Video data recording unit 22 of FIG. 3 is shown configured for playback of video data 19 in a manner as described elsewhere herein. Playback data 19 may be processed by video interface 11 to produce a modified playback signal 15 suitable for processing by video compression unit 20, which may also be optionally configured with a playback mode to decompress recorded digital video data and convert it to analog playback video data 8 suitable for display by conventional video monitor equipment 40. In the embodiment of FIG. 3, cockpit control unit 28 is shown coupled to video compression unit 20 and video data recording unit 22 via control signal communication path 26 so as to allow control of video monitoring and recording functions from the cockpit (via control of record and playback modes of video compression unit 20 and/or video data recording unit 22), for example, for purposes similar to those described in relation to FIG. 1. As shown, DC voltage 25 is provided by a suitable power supply and power converter, as described elsewhere herein.

Although certain exemplary embodiments have been described herein which utilize analog camera and/or analog monitor signals, it will be understood with benefit of this disclosure by those of skill in the art that the disclosed systems may also be configured to use and process digital camera and/or digital video monitor signals, for example, to provide a catastrophic event survivable video data recording system that only utilizes digital signals. It will also be understood with benefit of this disclosure by those of skill in the art that numerous combinations of different video compression units and video data recording units are possible, and that computers/processors may be programmed to allow transfer of data between these units based on the individual operating characteristics (i.e., bit stream characteristics) of the particular selected components. In this regard, data processors known in the art may be programmed to perform a video data interface function between a number of types of video compression units and video data recorders, depending on the input and/or output characteristics of each.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed apparatus and methods may be utilized in various combinations and/or independently. Thus the invention is not limited to only those combinations shown herein, but rather may include other combinations. Furthermore, as used herein, the indefinite articles "a" and "an" connote "one or more."

REFERENCES

The following references, to the extent that they provide exemplary details supplementary to those set forth herein, are specifically incorporated herein by reference:

U.S. Pat. No. 4,644,494
U.S. Pat. No. 4,694,119;
U.S. Pat. No. 4,729,102;
U.S. Pat. No. 4,944,401;
U.S. Pat. No. 5,123,538
U.S. Pat. No. 5,283,643;
U.S. Pat. No. 5,499,164;
U.S. Pat. No. 5,708,565;
U.S. Pat. No. 5,750,925;
U.S. Pat. No. 5,756,934;
U.S. Pat. No. 5,841,638

What is claimed is:

1. A catastrophic event-survivable video recording system, comprising:
    a video data compression unit having at least a first output, said first output comprising compressed digital video data;
    a solid state video data recording unit having at least a first input in signal communication with said first output from said video data compression unit, said solid state video data recording unit being capable of recording compressed digital video data in catastrophic event-survivable form; and
    a video data interface in signal communication between said video compressor first output and said solid state video data recording unit first input, said video data interface being capable of converting said compressed video data of said video data compression unit first output to a compressed video data signal that is suitable for recording by said solid state video data recording unit as a signal input to said video data recording unit first input;
    wherein said solid state video data recording unit comprises a conventional flight data recording unit including a processor, said conventional flight data recording unit being manufactured so that said processor runs at a first processing speed; and wherein said conventional flight data recording unit is configured with a software modification to cause said processor to run at a second processing speed, said second processing speed being faster than said first processing speed.

2. The video data recording system of claim 1, wherein said video data interface is configured to modify the bandwidth and frame format of said compressed video data.

3. The video recording system of claim 1, wherein said video data compression unit further comprises at least a first input, said first input comprising analog video data, and wherein said video data compression unit is capable of converting said analog video data to said compressed digital video of said video data compression unit first output.

4. The video recording system of claim 3, wherein said video data interface is capable of converting said compressed video data of said video data compression unit first output to compressed video data output having a serial data and clock stream generated at a rate of about 256 Kbps; and wherein said solid state video data recording unit is capable of receiving and recording said compressed video data output having a serial data and clock stream generated at a rate of about 256 Kbps.

5. The video recording system of claim 1, wherein said video data compression unit produces said compressed digital video data first output at a variable rate.

6. The video recording system of claim 1, further comprising at least one video camera, said video camera having an output comprising analog video data; and wherein said video cameral output is in signal communication with said video compression unit first input.

7. The video recording system of claim 1, wherein said system is configured for installation on an aircraft; and wherein said solid state video data recording unit has at least a first output, said first output comprising compressed digital video playback data, said solid state video data recording unit being capable during flight operations of playing back said compressed digital video data that is recorded in catastrophic event-survivable form; wherein said video data compression unit has a second input in signal communication with said first output from said solid state video data recording unit and has a second output comprising analog video playback data, said video data compression unit being capable during flight operations of converting compressed digital video data to said analog video playback data; and wherein said video data interface is capable during flight operations of converting said compressed digital video playback data of said solid state video data recording unit first output to a compressed digital video data signal that is suitable for input to said second input of said video data compression unit and conversion by said video data compression unit to said analog video playback data of said video data compression unit second output.

8. The video recording system of claim 1, wherein said system is configured for installation on a vehicle.

9. The video recording system of claim 1, wherein said system is configured for installation on an aircraft.

10. The video recording system of claim 1, wherein said system is configured for installation on a land-based or sea-based facility.

11. The video recording system of claim 8, wherein said video data interface is capable of converting said compressed video data of said video data compression unit first output to compressed video data having a serial data and clock stream generated at a rate of from about 250 Kbps to about 500 Kbps.

12. The video recording system of claim 11, wherein said solid state video data recording unit is capable of saving at least about 30 minutes of compressed digital video data recorded prior to a catastrophic event.

13. The video recording system of claim 11, further comprising at least one video camera, said video camera having an output comprising analog video data; and wherein said video camera1 output is in signal communication with said video compression unit first input.

14. The video recording system of claim 11, wherein said system is configured for installation on an aircraft.

15. A catastrophic event-survivable video recording system, comprising:
    a video data compression unit having at least a first output, said first output comprising compressed digital video data;
    a solid state video data recording unit having at least a first input in signal communication with said first output from said video data compression unit, said solid state video data recording unit having at least a recording mode in which it is capable of recording compressed digital video data in catastrophic event-survivable form;
    a video data interface in signal communication between said video compressor first output and said solid state video data recording unit first input, said video data interface having at least a recording mode in which it is capable of converting said compressed video data of said video data compression unit first output to a compressed video data signal that is suitable for recording by said solid state video data recording unit as a signal input to said video data recording unit first input; and
    at least one video camera, said video camera having an output comprising video data; and wherein said video camera output is in signal communication with a first input of said video compression unit;
    wherein said video data interface is capable of converting said compressed video data of said video data compression unit first output to compressed video data having a serial data and clock stream generated at a rate of from about 250 Kbps to about 350 Kbps;
    wherein said solid state video data recording unit comprises a conventional flight data recording unit including a processor, said conventional flight data recording unit being manufactured so that said processor runs at a first processing speed; and wherein said conventional flight data recording unit is configured with a software modification to cause said processor to run at a second processing speed, said second processing speed being faster than said first processing speed.

16. The video recording system of claim 15, wherein said system is configured for installation on an aircraft.

17. The video recording system of claim 16, wherein said video data interface is configured to modify the bandwidth and frame format of said compressed video data; and wherein said video data recording unit is capable of saving at least about 30 minutes of said compressed digital video data recorded prior to a catastrophic event.

18. The video recording system of claim 16, wherein said video camera has an output comprising analog video data; and wherein said video data compression unit is capable of converting said analog video data to said compressed digital video of said video data compression unit first output.

19. The video recording system of claim 18, wherein said video data interface is capable of converting said compressed video data of said video data compression unit first output to compressed video data output having a serial data and clock stream generated at a rate of about 256 Kbps; and wherein said solid state video data recording unit is capable of receiving and recording said compressed video data output having a serial data and clock stream generated at a rate of about 256 Kbps.

20. The video recording system of claim 18, wherein said video data compression unit produces said compressed digital video data first output at a variable rate.

21. The video recording system of claim 16, wherein said solid state video data recording unit has at least a first output, said first output comprising compressed digital video playback data, said solid state video data recording unit having a playback mode in which it is capable during flight operations of playing back said compressed digital video data that is recorded in catastrophic event-survivable form; wherein said video data compression unit has a second input in signal communication with said first output from said solid state video data recording unit and has a second output comprising video playback data, said video data compression unit having a playback mode in which it is capable during flight operations of converting compressed digital video data to said video playback data; and wherein said video data interface is capable during flight operations of converting said compressed digital video playback data of said solid state video data recording unit first output to a compressed digital video data signal that is suitable for input to said second input of said video data compression unit and conversion by said video data compression unit to said video playback data of said video data compression unit second output.

22. The video recording system of claim 16, wherein said video camera is configured for mounting on an exterior surface of said aircraft, in the cockpit of said aircraft, in the passenger cabin of said aircraft, or in the cargo hold of said aircraft.

23. The video recording system of claim 16, further comprising a video processor and a cockpit control unit;
wherein said video processor has a control input, a video data input and a video data output;
wherein said cockpit control unit has a control output, video data input and video data output;
wherein said video processor video data input is in signal communication with an analog video data output of said video compression unit;
wherein said video processor video data output is in signal communication with said video data input of said cockpit control unit;
wherein said video processor control input is in signal communication with said cockpit control unit control output;
wherein said cockpit control unit video output is in signal communication with at least one video display configured to be used or mounted within said aircraft; and
wherein said cockpit control unit is capable of controlling said video processor video data output to said video display to play back during flight operations said compressed digital video data in displayable form.

24. The video recording system of claim 21, further comprising a cockpit control unit;
wherein said cockpit control unit has a control output that is in signal communication with a control input of said video data compression unit, and wherein said cockpit control unit has a control output that is in signal communication with a control input of said solid state video data recording unit;
wherein said video data compression unit second output is in signal communication with at least one video display configured to be used or mounted within said aircraft; and
wherein said cockpit control unit is capable of controlling said recording and playback modes of said video compression unit and said solid state video data recording unit so as to control recording of said video data during flight operations from said video camera by said solid state video data recording unit, to control display of said video playback data during flight operations by said video display, or a combination thereof.

25. The video recording system of claim 15, wherein said system is configured for installation on an aircraft; and further comprising a cockpit control unit, said cockpit control unit having a control output that is in signal communication with a control input of said video data compression unit and a control output that is in signal communication with a control input of said solid state video data recording unit; and
wherein said video data compression unit second output is in signal communication with at least one video display configured to be used or mounted within said aircraft;
wherein said video camera has an output comprising analog video data, and is configured for is mounting on an exterior surface of said aircraft, in the cockpit of said aircraft, in the passenger cabin of said aircraft, or in the cargo hold of said aircraft;
wherein said solid state video data recording unit is a conventional flight data recording unit capable of saving at least about 30 minutes of compressed digital video data recorded prior to a catastrophic event;
wherein said video data compression unit is capable of converting said analog video data to said compressed digital video of said video data compression unit first output;
wherein said video data interface is capable of converting said compressed video data of said video data compression unit first output to compressed video data output having a serial data and clock stream generated at a rate of about 256 Kbps;
wherein said solid state video data recording unit is capable of receiving and recording said compressed video data output having a serial data and clock stream generated at a rate of about 256 Kbps;
wherein said solid state video data recording unit has at least a first output, said first output comprising compressed digital video playback data, said solid state video data recording unit having a playback mode in which it is capable during flight operations of playing back said compressed digital video data that is recorded in catastrophic event-survivable form;
wherein said video data compression unit has a second input in signal communication with said first output from said solid state video data recording unit and has a second output comprising analog video playback data, said video data compression unit having a playback mode in which it is capable during flight operations of converting compressed digital video data to said analog video playback data;
wherein said video data interface is capable during flight operations of converting said compressed digital video playback data of said solid state video data recording unit first output to a compressed digital video data signal that is suitable for input to said second input of said video data compression unit and conversion by said video data compression unit to said analog video playback data of said video data compression unit second output; and
wherein said cockpit control unit is capable of controlling said recording and playback modes of said video compression unit and said solid state video data recording unit so as to control recording during flight operations of said analog video data from said video camera by said solid state video data recording unit, to control display during flight operations of said analog video playback data by said video display, or a combination thereof.

26. A method of recording raw video data onto a catastrophic event-survivable video recording unit, comprising:
compressing said raw video data to form compressed digital video data;
converting said compressed digital video data to a compressed video data signal that is suitable for recording by a solid state video data recording unit; and
recording said compressed video data on a solid state video data recording unit in catastrophic event-survivable form;
wherein said solid state video data recording unit comprises a conventional flight data recording unit including a processor, said conventional flight data recording unit being manufactured so that said processor runs at a first processing speed; and wherein said conventional flight data recording unit is configured with a software modification to cause said processor to run at a second processing speed, said second processing speed being faster than said first processing speed.

27. The method of claim 26, further comprising modifying a bandwidth and frame format of said compressed video data; and wherein said raw video data comprises analog video data generated by at least one video camera; wherein said compressing further comprises converting said analog video data to said compressed digital video data; wherein said compressed digital video data has a serial data and clock stream generated at a rate of from about 250 Kbps to about 500 Kbps; wherein said raw video data generation, conversion, compression and recording occurs on an aircraft; and wherein said solid state video data recording unit is a conventional flight data recording unit capable of saving at least about 30 minutes of said compressed digital video data recorded prior to a catastrophic event.

28. The method of claim 26, wherein said raw video data generation, compression, conversion and recording occurs on an aircraft; and further comprising performing the following steps during flight operations:
  playing back said recorded compressed digital video data from said solid state video data recording unit to form compressed digital video playback data;
  converting said compressed digital video playback data to a modified compressed playback signal suitable for processing by a video compression unit; and
  decompressing said modified compressed playback signal in a video compression unit to form a decompressed playback signal.

29. The method of claim 28, further comprising converting said decompressed playback signal to analog playback video data during said flight operations; and displaying said analog playback vide data during said flight operations simultaneous with recording of new compressed digital video data.

30. A catastrophic event-survivable video recording system, comprising:
  a video data compression unit having at least a first output, said first output comprising compressed digital video data;
  a solid state video data recording unit having at least a first input in signal communication with said first output from said video data compression unit, said solid state video data recording unit being capable of recording compressed digital video data in catastrophic event-survivable form; and
  wherein said solid state video data recording unit comprises a conventional flight data recording unit including a processor, said conventional flight data recording unit being manufactured so that said processor runs at a first processing speed; and wherein said conventional flight data recording unit is configured with a software modification to cause said processor to run at a second processing speed, said second processing speed being faster than said first processing speed.

31. The video data recording system of claim 30, further comprising a video data interface in signal communication between said video compressor first output and said solid state video data recording unit first input, said video data interface being capable of converting said compressed video data of said video data compression unit first output to a compressed video data signal that is suitable for recording by said solid state video data recording unit as a signal input to said video data recording unit first input; wherein said video data interface is configured to modify the bandwidth and frame format of said compressed video data.

32. A method of recording raw video data onto a catastrophic event-survivable video recording unit, comprising:
  compressing said raw video data to form compressed digital video data; and
  recording said data on a solid state video data recording unit in catastrophic event-survivable form;
  wherein said solid state video data recording unit comprises a conventional flight data recording unit including a processor, said conventional flight data recording unit being manufactured so that said processor runs at a first processing speed; and wherein said conventional flight data recording unit is configured with a software modification to cause said processor to run at a second processing speed, said second processing speed being faster than said first processing speed.

33. The method of claim 32, further comprising modifying a bandwidth and frame format of said compressed video data; and converting said compressed digital video data to a compressed video data signal that is suitable for recording by a solid state video data recording unit.

34. The video recording system of claim 7, wherein said video recording system is configured to playback said compressed video playback data, convert said compressed video playback data for display, and display said compressed video playback data during flight simultaneous with recording of new compressed digital video data.

35. The video recording system of claim 21, wherein said video recording system is configured playback said compressed video playback data, convert said compressed video playback data for display, and display said compressed video playback data during flight simultaneous with recording of new compressed digital video data.

36. The video recording system of claim 23, wherein said video recording system is configured to playback said compressed video playback data, convert said compressed video playback data for display, and display said compressed video playback data during flight simultaneous with recording of new compressed digital video data.

37. The video recording system of claim 25, wherein said video recording system is configured to playback said compressed video playback data, convert said compressed video playback data for display, and display said compressed video playback data during flight simultaneous with recording of new compressed digital video data.

38. A catastrophic event-survivable video recording system, comprising:
  a video data compression unit having at least a first output, said first output comprising compressed digital video data;
  a solid state video data recording unit having at least a first input in signal communication with said first output from said video data compression unit, said solid state video data recording unit being capable of recording compressed digital video data in catastrophic event-survivable form;
  wherein said system is configured for installation on an aircraft;
  wherein said solid state video data recording unit has at least a first output, said first output comprising compressed digital video playback data, said solid state video data recording unit being capable during flight operations of playing back said compressed digital video data that is recorded in catastrophic event-survivable form; and
  wherein said solid state video data recording unit comprises a conventional flight data recording unit including a processor, said conventional flight data recording unit being manufactured so that said processor runs at a first processing speed; and wherein said conventional flight data recording unit is configured with a software modification to cause said processor to run at a second processing speed, said second processing speed being faster than said first processing speed.

39. The catastrophic event-survivable video recording system of claim 38, wherein said video recording system is configured to playback said compressed video playback data, convert said compressed video playback data for display, and display said compressed video playback data during flight simultaneous with recording of new compressed digital video data.

40. A method of recording raw video data onto a catastrophic event-survivable video recording unit installed on an aircraft, comprising:

compressing said raw video data to form compressed digital video data; and recording said data on a solid state video data recording unit in catastrophic event-survivable form; and playing back said recorded compressed digital video data during flight operations from said solid state video data recording unit;

wherein said solid state video data recording unit comprises a conventional flight data recording unit including a processor, said conventional flight data recording unit being manufactured so that said processor runs at a first processing speed; and wherein said conventional flight data recording unit is configured with a software modification to cause said processor to run at a second processing speed, said second processing speed being faster than said first processing speed.

41. The method of claim 40, wherein said method further comprises playing back said compressed video playback data, converting said compressed video playback data for display, and displaying said compressed video playback data during flight simultaneous with recording of new compressed digital video data.

* * * * *

UNITED STATES PATENT AND TRADEMARK OFFICE
CERTIFICATE OF CORRECTION

PATENT NO. : 7,027,719 B1 Page 1 of 1
APPLICATION NO. : 10/782654
DATED : April 11, 2006
INVENTOR(S) : Schneider et al.

It is certified that error appears in the above-identified patent and that said Letters Patent is hereby corrected as shown below:

In claim 29, column 21, line 29, delete "vide," and insert --video--.

Signed and Sealed this

Eighteenth Day of July, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,027,719 B1 | Page 1 of 1 |
| APPLICATION NO. | : 09/676333 | |
| DATED | : April 11, 2006 | |
| INVENTOR(S) | : Schneider et al. | |

It is certified that error appears in the above-identified patent and that said Letters Patent is hereby corrected as shown below:

In claim 29, column 21, line 29, delete "vide," and insert --video--.

This certificate supersedes certificate of correction issued July 18, 2006.

Signed and Sealed this

Twenty-ninth Day of August, 2006

JON W. DUDAS
*Director of the United States Patent and Trademark Office*